United States Patent
Kosthorst et al.

(10) Patent No.: US 9,040,162 B2
(45) Date of Patent: May 26, 2015

(54) FILMS MATTED ON ONE SIDE AND THE USE THEREOF

(75) Inventors: Helge Kosthorst, Visselhövede (DE); Dirk Schultze, Bomlitz (DE)

(73) Assignee: Epurex Films GmbH & Co. KG, Walsrode (DE)

( * ) Notice: Subject to any disclaimer, the term of this patent is extended or adjusted under 35 U.S.C. 154(b) by 284 days.

(21) Appl. No.: 13/505,628

(22) PCT Filed: Nov. 3, 2010

(86) PCT No.: PCT/EP2010/066728
§ 371 (c)(1),
(2), (4) Date: May 2, 2012

(87) PCT Pub. No.: WO2011/054859
PCT Pub. Date: May 12, 2011

(65) Prior Publication Data
US 2012/0220913 A1   Aug. 30, 2012

(30) Foreign Application Priority Data
Nov. 5, 2009   (DE) .......................... 10 2009 052 044

(51) Int. Cl.
| | | |
|---|---|---|
| B32B 27/40 | (2006.01) | |
| B32B 27/32 | (2006.01) | |
| C08G 18/06 | (2006.01) | |
| C08L 25/08 | (2006.01) | |
| B32B 27/08 | (2006.01) | |
| B32B 27/28 | (2006.01) | |
| C08G 18/48 | (2006.01) | |
| C08G 18/66 | (2006.01) | |
| C08G 18/76 | (2006.01) | |
| C08L 75/08 | (2006.01) | |

(52) U.S. Cl.
CPC ......... *B32B 27/08* (2013.01); *Y10T 428/24942* (2015.01); *Y10T 428/2495* (2015.01); *B32B 27/28* (2013.01); *B32B 27/40* (2013.01); *C08G 18/4833* (2013.01); *C08G 18/4854* (2013.01); *C08G 18/6674* (2013.01); *C08G 18/7671* (2013.01); *C08L 75/08* (2013.01)

(58) Field of Classification Search
USPC .............. 428/424.8, 212, 213, 423.3; 602/52
See application file for complete search history.

(56) References Cited

U.S. PATENT DOCUMENTS

| | | | |
|---|---|---|---|
| 4,614,183 A | 9/1986 | McCracken et al. | |
| 5,210,127 A * | 5/1993 | Werner et al. ................. | 524/589 |
| 5,254,641 A | 10/1993 | Alex et al. | |
| 5,395,681 A | 3/1995 | Hargarter et al. | |
| 5,674,600 A * | 10/1997 | Hargarter et al. ............. | 428/212 |
| 5,840,812 A | 11/1998 | Schultze | |
| 5,866,257 A | 2/1999 | Schledjewski et al. | |
| 5,876,852 A | 3/1999 | Hargarter et al. | |
| 5,908,690 A * | 6/1999 | Schultze et al. ............. | 428/220 |
| 6,001,464 A | 12/1999 | Schultze et al. | |
| 6,524,712 B1 | 2/2003 | Schledjewski et al. | |
| 2006/0014035 A1* | 1/2006 | Montanari et al. ......... | 428/474.4 |
| 2006/0189754 A1* | 8/2006 | Serhatkulu et al. ............. | 525/64 |

FOREIGN PATENT DOCUMENTS

| | | |
|---|---|---|
| CA | 2074928 A1 | 2/1993 |
| CA | 2135958 A1 | 5/1995 |
| DE | 4022741 A1 | 1/1992 |
| DE | 4126499 A1 | 2/1993 |
| DE | 4236569 A1 | 5/1994 |
| EP | 308 683 A1 | 3/1989 |
| EP | 526 858 A2 | 2/1993 |
| EP | 0525567 A2 | 2/1993 |
| EP | 0 571 868 A1 | 12/1993 |
| EP | 0 591 782 A2 | 4/1994 |
| EP | 603 680 A2 | 6/1994 |
| EP | 0 658 581 A2 | 6/1995 |
| EP | 0714950 A2 | 6/1996 |
| EP | 0754543 A2 | 1/1997 |
| EP | 0842768 A2 | 5/1998 |
| EP | 1145847 A1 | 10/2001 |
| WO | WO-99/38927 A1 | 8/1999 |

OTHER PUBLICATIONS

International Search Report for PCT/EP2010/066728 mailed Dec. 10, 2010.

* cited by examiner

*Primary Examiner* — Thao T Tran
(74) *Attorney, Agent, or Firm* — Drinker Biddle & Reath LLP

(57) ABSTRACT

The invention relates to multi-layer elastic thermoplastic films, which consist of at least one layer of thermoplastic polyurethane (TPE-U), at least one further layer of thermoplastic polyurethane which is blended with modified acrylonitrile-butadiene-styrene copolymer (MABS), and optionally at least one support layer of thermoplastic polymer which is incompatible with TPE-U, and to the use thereof.

12 Claims, No Drawings

FILMS MATTED ON ONE SIDE AND THE USE THEREOF

CROSS-REFERENCE TO RELATED APPLICATIONS

This application is a national stage application (under 35 U.S.C. §371) of PCT/EP2010/066728, filed Nov. 3, 2010, which claims benefit of German application 10 2009 052 044.9, filed Nov. 5, 2009, both of which are incorporated herein by reference in their entirety for all their useful purposes.

BACKGROUND

The invention relates to multi-layer elastic thermoplastic films, which consist of at least one layer of thermoplastic polyurethane (TPE-U), at least one further layer of thermoplastic polyurethane which is blended with modified acrylonitrile-butadiene-styrene copolymer (MABS), and optionally at least one support layer of thermoplastic polymer which is incompatible with TPE-U, and to the use thereof, in particular for the water-tight and breathable sealing of fabrics, such as wovens and non-wovens, and the everyday objects produced therefrom, in particular in the clothing sector and in the medical wound covering sector.

It is known that the clothing sector and the medical sector can be served with films of cast polyurethane. Owing to the specific properties of cast polyurethane, a relatively expensive matted release liner is necessary here. Moreover, the polyurethane is cast from reactive dispersions which still have to cure fully, and there is the risk that low molecular weight residual components may remain if the process is not carried out properly. These low molecular weight components often display migration tendencies, which means that these films are no longer acceptable for applications in direct contact with skin. In addition, they are not hard-wearing and are therefore unusable.

It is also known that pore-free films with high water vapour permeability, as described e.g. in EP-A 0 591 782, are used. In EP-A 0 658 581, the use of hydrophilic TPE-Us in the sector of breathable textile fabrics is described.

A review of the group of the thermoplastic elastomers is provided by, for example:

Thermoplastic elastomers; a comprehensive review, ed. N. R. Legge, G. Holden and H. E. Schroeder, Carl Hanser Verlag, Munich, 1987 and Thermoplastische Elastomere—Herausforderung an die Elastomerverarbeiter, ed.: VDI-Gesellschaft Kunststofftechnik, VDI Verlag, Düsseldorf, 1997.

The use of hydrophilic TPE-Us for wound coverings is described e.g. in U.S. Pat. No. 4,614,183 or EP-A 0 714 950. The systems described there have the disadvantage that they achieve adequate slip behaviour only through the addition of large proportions of lubricants and anti-blocking agents. TPE-U structures optimised in terms of their water vapour permeability by coextrusion are known, for example from WO 99/38927 A1. The coextrudates of hydrophilic TPE-Us described there with different Shore-A hardnesses or different soft segment proportions likewise fail to exhibit adequate slip behaviour without the addition of large proportions of lubricants and anti-blocking agents.

Single-layer films of TPE-U, methods for their production and their use are known, for example from EP-A 0 308 683, EP-A 0 526 858, EP-A 0 571 868 or EP-A 0 603 680. The films described in these documents can be integrated as layers into so-called laminating films or have already been integrated into the laminating films that are known per se. The production of TPE-U films using substantially incompatible polymers as matting agents in TPE-U is also described e.g. in DE-A 41 26 499.

Multi-layer films produced by coextrusion from TPE-U and other polymers belonging to the group of the thermoplastics are also known. As well as coextrusion with polyolefinic thermoplastics, in which the polyolefinic layer generally has no composite adhesion with the TPE-U layer and only possesses the function of a support or release layer, multi-layer structures with good composite adhesion are also known. In EP-A 0 842 768, for example, a multi-layer structure of TPE-U and a polyolefinic adhesion promoter is described.

The reduction of the blocking behaviour of thermoplastic TPE-U by polystyrene is known, e.g. from EP-A 0 754 543. US-A 2006/0189754 describes a method for the production of compounded, transparent material mixtures and thick-walled articles with good slip properties made thereof In US-A 2006/0189754, mixtures containing up to 50% modified acrylonitrile-butadiene-styrene copolymer (MABS) in TPE-U were used. These articles have the disadvantage of low mechanical load-bearing capacity owing to the incompatibility of the components described. The articles according to US-A 2006/0189754 therefore utilise penetrable substrates as support material.

TPE-U films according to the prior art normally additionally contain common additives from the group comprising:
I. inorganic or organic anti-blocking agents,
II. lubricants or mould release agents,
III. pigments or fillers and
IV. stabilizers.

The proportion of the above additives I to IV is, in total, preferably between 0 wt. % and 30 wt. %, based on the film.

The most common additives, which can also be contained in the films according to the invention described below, are described for example by Gächter and Müller in: Plastics Additives, Carl Hanser Verlag Munich, $4^{th}$ edition (1996).

DESCRIPTION OF EMBODIMENTS

The object was therefore to provide a flexible elastic film with high breathability and non-glossy appearance which is low in migrating additives.

The need existed here for a readily bondable outer layer for pressure sensitive adhesive anchoring, a protective barrier layer and a matt surface combined with high water vapour permeability and permanent structural integrity in the form of adequate composite adhesion.

According to the invention, a film meeting the above requirements was successfully provided.

The present invention provides a multi-layer thermoplastic film, which is made up of at least two layers, wherein at least one layer (1) is formed from thermoplastic polyurethane (TPE-U) and at least one layer (2) from a blend of TPE-U and modified acrylonitrile-butadiene-styrene (MABS).

The proportion by weight of the TPE-U in the multi-layer film is preferably at least 80 wt. %.

A matt surface is particularly important, for example in the application as wound coverings, so as not to allow any gloss to occur that would impede visual diagnosis by the doctor and in order to leave the patient with an optical impression closely resembling that of the skin, which psychologically promotes the healing process.

In the case of very thin and flexible films, a support film is necessary as these cannot otherwise be handled either during production or during further processing, since even very low tensile forces, which are necessary for transporting the film through the plant, lead to considerable elongation of the film.

The support is therefore removed only when other layers, added in further processing steps, guarantee adequate stability or an elongation of the film is desired in the processing. These films with support layers require low gloss and good slip properties on the side facing the support, as this is generally open in the end products.

To minimise the costs incurred during manufacture, the production of the film according to the invention, which has a combination of the desired properties, preferably takes place in a one-step process.

Suitable TPE-Us or mixtures thereof can be produced, for example, by the known batch, semi-continuous or fully continuous processes (described e.g. in EP-A 1 145 847).

Suitable TPE-Us are available, for example, with the trade names Desmopan®, Elastollan®, Estane®, Morthane®, Pellethane®, Pearlthane®, Skythane®, Tecoflex® or Texin®.

In a particularly suitable embodiment, the films according to the invention have one or more layers of TPE-U, the soft segment phase of which is formed predominantly from polyether soft segment building blocks.

The layers (1) and (2) of the multi-layer film according to the invention are made up of at least one TPE-U, preferably of a TPE-U with a predominantly linear molecular structure, of which the longer-chain diol component is preferably a difunctional polyether and particularly preferably a difunctional hydrophilic polyether, and which has a Shore hardness of preferably 70-95 A, particularly preferably 80-90 A, determined in accordance with DIN 53 505.

The preferably hydrophilic TPE-Us are formed from alternating blocks of soft and hard segments, wherein the soft segments are formed from difunctional polyols, which are made up of polymerised ethers and/or esters, and wherein the hard segments are formed from the reaction products of low molecular weight diols, i.e. the chain extender and diisocyanates. These blocks are advantageously linked together in such a way that the hard segment forms both ends of the molecule chain in each case, and optionally the reactive isocyanate groups located at the ends of the linear molecule can be capped by alcohols.

According to the invention, for the individual layers of the film, TPE-Us with different water vapour permeability can be used. This can be achieved by different soft segments and/or modified hard segments of the TPE-Us in the individual layers. For the soft segments there is an increase in water absorption capacity in the order: polyester <polytetrahydrofuran<polyethylene oxide.

Also suitable are ether carbonate soft segment building blocks. These are distinguished by good resistance to hydrolysis. In addition, materials of this type display good resistance to fungal and microbial attack. Polytetramethylene glycol-based ether soft segment building blocks are particularly preferred.

For the hard segments, for example modifications such as those made e.g. in the double hydrophilic Impraperm® grades marketed by Bayer MaterialScience AG and those described e.g. in EP-A 0 525 567 and DE-A 42 36 569 are possible.

To produce the layer (2), in addition to the TPE-U described above, MABSs are used, preferably thermoplastic methyl methacrylate-acrylonitrile-butadiene-styrene polymers.

The MABS preparations used according to the invention preferably consist of copolymers containing methyl methacrylate (MMA), acrylonitrile, butadiene and styrene. They can be arranged in alternating blocks and segments or randomly. Particularly preferred are grafted copolymers with blocks of MMA, which are grafted on to units of terpolymers of acrylonitrile, butadiene and styrene or elastic copolymers of butadiene and styrene.

The TPE-U and MABS components can be mixed homogeneously in the molten state, but when cooled or solidified, they form multiple phases as a result of reducing miscibility. Thus, the MABS units are present in rigid domains after solidification of the melt. These thermally initiated changes in properties can be undergone multiple times, thus allowing numerous process steps with these materials.

The good adhesion of the blend of MABS/TPE-U to the layer of pure TPE-U is also surprising, since according to the prior art (US-A 2006/0189754) a penetrable support is necessary to obtain suitable mechanical properties.

Surprisingly, the MABS copolymers used according to the invention have a gloss-reducing effect in the TPE-U matrix when formed into thin-section films.

The use of mixtures of different TPE-Us based on different ethers is preferred, particularly preferably a mixture of different ether-based TPE-Us, at least one TPE-U of which has a soft segment molecular weight distribution that enables crystalline superstructures to form.

To produce layer (2), mixtures of the thermoplastic polyurethanes and the thermoplastic MABS copolymers are used. The phase separation of the blend can, if necessary, additionally be stabilised by adhesion-promoting and compatibilising substances, in particular modified PE copolymers.

In a preferred embodiment, the proportion of MABS copolymers in layer (2) is between 5 and 40 wt. %.

In a preferred embodiment, the thermoplastic polyurethane used in layer (1) substantially comprises soft segments made up of polytetrahydrofuran and polyethylene glycol ether groups.

In a particularly preferred embodiment, at least one further support layer (3) of a non-compatible thermoplastic polymer, preferably from the group of the polyolefins, which faces the TPE-U/MABS layer (2), is additionally added to the layers of TPE-U (1) and the layers of a blend of TPE-U/MABS (2). As polyolefins, particularly preferably polyethylenes (PE) and most particularly preferably low-density polyethylenes (PE-LD) are suitable.

It is surprising that the gloss-reducing effect of the MABS copolymers described above can also be detected even if the layer of TPE-U and MABS formulated as a blend is covered by the coextruded support layers of non-compatible plastic.

The layer structure according to the invention with additional support layers is used in particular with flexible or thin embodiments of the film, since the flexible elastic films described cannot otherwise be handled either during production or during further processing because even very low tensile forces, which are necessary for transporting the film through the plant, lead to considerable elongation of the film.

Films with an overall thickness of the TPE-U-containing layers (1) and (2) of between 10 μm and 50 μm are preferred, this thickness being particularly preferably between 15 μm and 25 μm. The thickness of the individual layers (1) or (2) is preferably between 5 μm and 45 μm.

The thickness of the optional support layer (3) is preferably between 15 μm and 100 μm.

To produce the multi-layer film according to the invention, the common thermoforming methods for processing plastics to form multi-layer flat materials are particularly suitable. Production by coextrusion should be mentioned here, which preferably takes place by the blown film method. By means of coextrusion, better composite adhesion of the pure TPE-U layer (1) and the layer (2) of mixtures of thermoplastic polyurethanes and thermoplastic MABS can additionally be achieved.

The films according to the invention can additionally have their surface properties modified by the known physical and chemical treatment methods, such as e.g. corona treatment, on one or both sides.

The films according to the invention are preferably used for separation between moisture sources and moisture sinks. For example, textile membranes and wound coverings are produced with the films according to the invention. Bonding with additionally necessary substrates, such as textiles or nonwovens and foams, takes place using common joining methods. Adhesive lamination is preferred.

The invention will be explained in more detail based on the following examples.

EXAMPLES

The films described in the context of the following examples and comparative examples were produced by blown film coextrusion. The structure of screw compounders suitable for plasticising thermoplastic resins is described, for example, by Wortberg, Mahlke and Effen in: Kunststoffe, 84 (1994) 1131-1138, by Pearson in: Mechanics of Polymer Processing, Elsevier Publishers, New York, 1985 or by the company Davis-Standard in: Paper, Film & Foil Converter 64 (1990), pp. 84-90. Dies for shaping the melt into films are explained inter alia by Michaeli in Extrusions-Werkzeuge, Hanser Verlag, Munich, 1991.

Starting Materials

Ether TPE-U: Thermoplastic polyurethane with crystalline superstructures based on polytetrahydrofuran, methylene diphenylene diisocyanate and butanediol as chain extender and having a Shore-A hardness of 87 measured in accordance with DIN 53 505, corresponding to a hardness of 36 Shore-D Hydrophilic ether TPE-U:
Thermoplastic polyurethane based on polyethylene glycol, methylene diphenylene diisocyanate and butanediol as chain extender and having a Shore A hardness of 83, measured in accordance with DIN 53 505, corresponding to a hardness of 32 Shore-D Silicate: Diatomaceous earth Thermoplastic MABS copolymer:
Transparent grafted methyl methacrylate-acrylonitrile-butadiene-styrene copolymer with a ball indentation hardness of 75 MPa in accordance with ISO 2039-1 measured with a 358 N load over 30 sec PE-LD: Polyethylene with low density without waxes and additional anti-blocking additives and having a density of 0.924 g/cm$^3$; Shore-D hardness of 48 measured in accordance with DIN 53 505

Example 1

Using a three-layer blown film die, a film with an 11 μm thick outer layer (1) was produced from a mixture of 70 wt. % of a thermoplastic ether TPE-U having a Shore-A hardness of 87 and 30 wt. % of a hydrophilic ether TPE-U having a Shore-A hardness of 83.

A 9 μm thick intermediate layer (2) facing the support layer (3) was produced from a mixture of 60 wt. % of a thermoplastic ether TPE-U having a Shore-A hardness of 87 and 30 wt. % of a hydrophilic ether TPE-U having a Shore-A hardness of 83 and 10 wt. % of a thermoplastic MABS copolymer.

The 40 μm thick support layer (3) was produced from a PE-LD having a density of 0.924 g/cm$^3$.

All of the components used for the respective layer were melted together in an extruder.

The extrusion apparatus was operated at temperatures of between 160° C. and 200° C. The three melt streams were superposed in a three-layer blown film die at an operating temperature of 195° C. and discharged through an annular die having a diameter of 600 mm. The annular melt web was cooled by blowing with air, and then laid flat, cut and wound.

Example 2

Using a two-layer blown film die, a film was produced, of which the first 20 μm thick layer (1) was formed from a thermoplastic ether TPE-U having a Shore-A hardness of 87. To this 20 μm thick layer, 4 wt. % silicate was added as an additive.

The second layer (2) was produced from a mixture of 89 wt. % of a thermoplastic ether TPE-U having a Shore-A hardness of 87 and 10 wt. % of a thermoplastic MABS copolymer.

All of the components used for the respective layer were melted together in an extruder.

The extrusion apparatus was operated at temperatures of between 160° C. and 190° C. The two melt streams were superposed in a two-layer blown film die at an operating temperature of 190° C. and discharged through an annular die having a diameter of 150 mm. The annular melt web was cooled by blowing with air, and then laid flat, cut and wound.

Comparative Example 3

Using a two-layer blown film die, a film was produced with an outer layer (1) having a thickness of 20 μm comprising a mixture of 70 wt. % of a thermoplastic ether TPE-U having a Shore-A hardness of 87 and 30 wt. % of a hydrophilic ether TPE-U having a Shore-A hardness of 83.

A 40 μm thick support layer (3) was produced from a PE-LD having a density of 0.924 g/cm$^3$.

All of the components used for the respective layer were melted together in an extruder.

The extrusion apparatus was operated at temperatures of between 160° C. and 200° C. The two melt streams were superposed in a two-layer blown film die at an operating temperature of 195° C. and discharged through an annular die having a diameter of 500 mm. The annular melt web was cooled by blowing with air, and then laid flat, cut and wound.

Comparative Example 4

Using a two-layer blown film die, a film was produced with an outer layer (1) having a thickness of 20 μm comprising a mixture of 55 wt. % of a thermoplastic ether TPE-U having a Shore-A hardness of 87, 30 wt. % of a hydrophilic ether TPE-U having a Shore-A hardness of 83 and 10 wt. % of a thermoplastic MABS copolymer.

A 40 μm thick support layer (3) was produced from a PE-LD having a density of 0.924 g/cm3.

All of the components used for the respective layer were melted together in an extruder.

The extrusion apparatus was operated at temperatures of between 160° C. and 200° C. The two melt streams were superposed in a two-layer blown film die at an operating temperature of 195° C. and discharged through an annular die having a diameter of 500 mm. The annular melt web was cooled by blowing with air, and then laid flat, cut and wound.

Comparative Example 5

Using a single-layer blown film die, a film was produced which was formed from a thermoplastic ether TPE-U having a Shore-A hardness of 87. To this 30 μm thick film, 4 wt. % silicate was added as an additive.

All of the components used were melted together in an extruder.

The extrusion apparatus was operated at temperatures of between 160° C. and 190° C. The melt stream was fed to a single-layer blown film die with a processing temperature of 190° C. and discharged through an annular die having a diameter of 500 mm. The annular melt web was cooled by blowing with air, and then laid flat, cut and wound.

Evaluation of the Films Produced

All five of the films were tested for water vapour permeability, measured in accordance with DIN 53 122 at 38° C. and 90% relative humidity, and mechanical load-bearing capacity, measured in accordance with DIN EN ISO 527 (tensile test) and DIN 53 515 (tear propagation resistance). The adhesion between support and TPE-U was measured on the basis of ASTM F88a on a strip width of 200 mm. The gloss measurement took place in accordance with DIN 67530 on the side facing the support or, in the case of unsupported films, on the side with the lower gloss. The coefficient of friction of film against metal was determined in accordance with DIN EN ISO 8295 on the same side as the gloss measurement.

|  | Example 1 | Example 2 | Comp. example 3 | Comp. example 4 | Comp. example 5 |
|---|---|---|---|---|---|
| Thickness [μm] | 20 | 30 | 20 | 20 | 30 |
| Water vapour permeability DIN 53 122 at 38° C./90% rel. humidity [g/m²] per day | 2300 | 1200 | 2400 | 2250 | 1280 |
| Ultimate tensile stress [MPa] DIN EN ISO 527 | 35 | 45 | 40 | 22 | 55 |
| Elongation at break [%] DIN EN ISO 527 | 660 | 570 | 630 | 550 | 610 |
| Separating force TPE-U/support [N] | 0.41 | N/A | 0.42 | 0.40 | N/A |
| Gloss 20° | 1.6 | 1.5 | 3.2 | 1.4 | 2.1 |
| Gloss 60° | 14.4 | 14.2 | 27.7 | 14.1 | 20.6 |
| Gloss 85° | 23.2 | 22.0 | 57.5 | 23.4 | 40.5 |
| Coefficient of friction film/metal DIN EN ISO 8295 | 0.47 | 0.44 | 0.49 | 0.45 | 0.48 |

The films according to the invention from examples 1 and 2 are clearly superior to the known films from comparative examples 3 to 5. As a result of the film structure according to the invention in examples 1 and 2, a clear reduction of the gloss was achieved at all measuring angles compared with comparative examples 3 and 5. Although comparative example 4 displays similar gloss, the ultimate tensile stress is clearly below that of the other films and is inadequate.

The separating force between the support film and the TPE-U layers and the coefficient of friction are similarly good in all of the multi-layer films.

The water vapour permeability of the multi-layer films according to the invention is likewise similar to that of the known films (example 1 compared with comparative example 3 and example 2 compared with comparative example 5).

The invention claimed is:

1. An at least three layer elastic, thermoplastic film having good surface slip, wherein the film comprises a first layer (1) comprising a thermoplastic polyurethane, a second layer (2) comprising a mixture of a thermoplastic polyurethane and a modified acrylonitrile-butadiene-styrene copolymer, and a third layer (3) comprising a low-density polyethylene which is incompatible with thermoplastic polyurethane.

2. The film according to claim 1, wherein the second layer (2) is arranged between the first layer (1) and the third layer (3).

3. The film according to claim 1, wherein the proportion by weight of the first layer (1) in the film is at least 70 wt. %.

4. The film according to claim 1, wherein the film comprises six layers with three first layers (1), one third layer (3) and two second layers (2) arranged between the third layer (3) and first layers (1).

5. The film according to claim 1, wherein the mixture of layer (2) consists of 5 to 40 wt. % modified acrylonitrile-butadiene-styrene copolymer and 60 to 95 wt. % thermoplastic polyurethane.

6. The film according to claim 1, wherein the thermoplastic polyurethane used in layer (1) comprises soft segments made up of poly-tetrahydrofuran and polyethylene glycol ether groups 7. The film according to claim 1, wherein the thermoplastic polyurethane used in layer (1) comprises soft segments made up of poly-ether carbonate groups.

8. The film according to claim 1, wherein the film is produced by a blown film process.

9. The film according to claim 1, wherein the film has an overall thickness of 25 μm to 150 μm, wherein the thickness of the first layer(s) (1) is between 5 μm and 45 μm and the thickness of the second layer(s) (2) is between 5 μm and 45 μm and the thickness of the third layer (3) is between 15 μm and 100 μm.

10. A membrane system comprising the film according to claim 1.

11. A wound covering comprising the film according to claim 1.

12. The film according to claim 1, wherein in a film wherein the first layer (1) and the second layer (2) are of 20 μm thickness the gloss determined according to DIN 67530 is 1.6 at 20° and the ultimate tensile stress is 35 MPa measured according to DIN EN ISO 527.

* * * * *